UNITED STATES PATENT OFFICE.

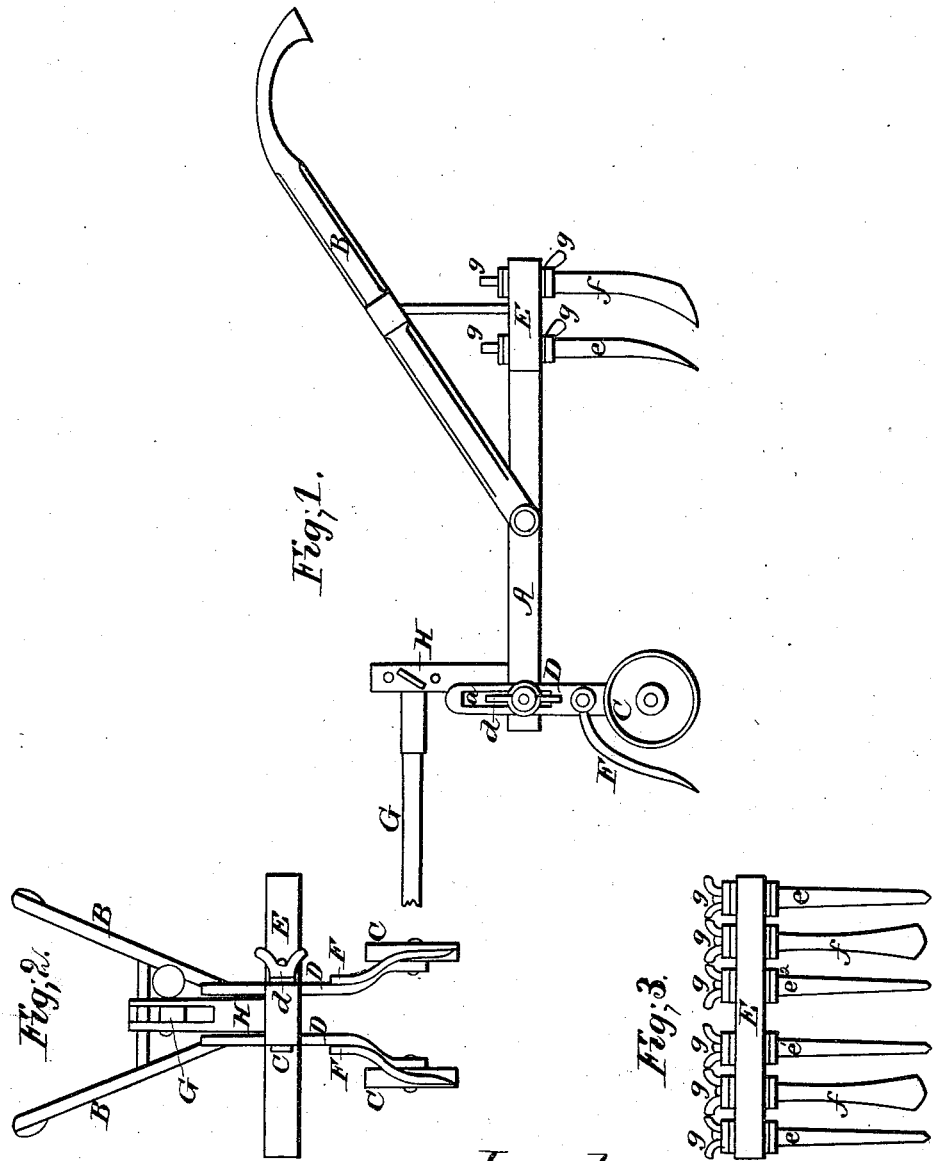

JOHN SCHEIBLEIN AND JOHN HEITZMAN, OF PHILADELPHIA, PENNSYLVANIA.

Letters Patent No. 84,910, dated December 15, 1868.

IMPROVEMENT IN HAND-CULTIVATORS.

The Schedule referred to in these Letters Patent and making part of the same.

*To all whom it may concern:*

Be it known that we, JOHN SCHEIBLEIN and JOHN HEITZMAN, both of the city and county of Philadelphia, and State of Pennsylvania, have invented a new and useful Hand-Cultivator; and we do hereby declare that the following is a full, clear, and exact description of the same, reference being had to the accompanying sheet of drawings, and to the letters of reference marked thereon.

Our invention is a hand-cultivator for the purpose of removing weeds, and stirring up and loosening the soil between the rows of plants, &c.

It consists of a double row of cultivators, fixed in a frame, the front row being coulters, and the back one, ploughs.

They are so arranged, that those in the hind row shall work in a track between that of the fore ones.

The fore end of the frame is supported on two wheels.

Both the wheels and the cultivators are adjustable vertically, by which the depth of cultivating are the height of the frame from the ground are regulated to suit the height of the plants.

A clearer is fixed to each wheel-standard. They project in front of the wheels, and serve to remove all obstructions, as fallen vines, plants, &c.

On reference to the accompanying sheet of drawings, making part of this specification—

Figure 1 is a side view;

Figure 2 is a front view, showing the clearers, and the method employed for adjusting the front height of the frame by means of the wheel-standards; and Figure 3 is a back view of the transverse plate of the framing and the cultivators, the stilts, or handles, and the wheels, not being shown.

Similar letters refer to similar parts in the several views.

A is the frame of the cultivator, about midway of the ends of which the stilts or handles B are fixed.

The wheels C C, which carry the fore end of the frame, turn on pins in the ends of the vertical adjusting-standards D D, which slide through mortises formed near the fore end of the frame.

They are made outwardly curving at their lower ends to straddle the row of plants.

A slot, $a$, is formed lengthwise in the upper end of each.

A screw-bolt, $c$, which passes transversely through the fore end of the frame, its ends projecting through the slots $a$, enables the fore end of the frame to be adjusted vertically.

A thumb-screw, $d$, of the bolt $c$, tightens the standards to the frame, and prevents them from slipping.

A double row of cultivators, $e\ f$, is fixed to the transverse plate E of the frame, the front row $e$ being coulters, and the hind row, plows.

They are so fixed relatively to each other that those of the hind row shall work in a track between those of the fore row.

The coulters, marked $e^1\ e^2$, straddle the row, and sever the roots which extend between the rows, so that the plows, $f$, coming immediately after, cannot tear the plants from the ground, by fastening in the roots.

The coulters $e\ e$ also sever the roots of the adjacent rows.

Both the coulters and the plows are adjustable vertically by means of the thumb-screws $g$.

F are clearers, fixed to the standards D.

They are so formed as to take, one in front of each wheel C, and are used, when cultivating vine-growing ground, to remove from the path of the cultivator such vines as lie close to the ground, or have been beaten down by storms, &c.

A pole, G, is coupled to the front of the cultivator, by means of the standard H.

The cultivator can be managed by two boys, one pulling on the pole and the other holding the stilts, or handles, saving the cost of a man and horse.

In horse-cultivators, the rows require to be set two feet apart, to enable the horse to walk without treading on the rows. By our hand-cultivator they can be laid out eight inches apart, thereby vastly increasing the productiveness of the ground.

The stilts, or handles, and the wheels at the front, give the operator power to work with the greatest nicety, and when it becomes choked, to throw it out of work.

It can be manufactured of a variety of sizes adapted to the various kinds of plants, and systems of husbandry.

What we claim as our invention, and desire to secure by Letters Patent, is—

1. The coulters $e$, plows $f$, and the transverse plate E, when combined and arranged as shown and described.

2. The frame A, stilts B, transverse plate E, standards D D, pin $c$, wheels C, clearers F, coulters $e$, and the plows $f$, when combined and arranged as shown and described.

In testimony whereof, we hereunto sign our names to this specification, in presence of two subscribing witnesses.

JOHN SCHEIBLEIN.
JOHN HEITZMAN.

Witnesses:
FRANCIS D. PASTORIUS,
DAVID BEITLER.